United States Patent [19]

Akao et al.

[11] Patent Number: 5,240,754
[45] Date of Patent: Aug. 31, 1993

[54] CONTAINER FOR PHOTOGRAPHIC FILM CARTRIDGE

[75] Inventors: Mutsuo Akao; Toshio Sata, both of Kanagawa, Japan

[73] Assignee: Fuji Photo Film Co., Ltd., Minami-ashigara, Japan

[21] Appl. No.: 246,927

[22] Filed: Sep. 19, 1988

Related U.S. Application Data

[63] Continuation of Ser. No. 24,473, Mar. 11, 1987, abandoned.

[30] Foreign Application Priority Data

Mar. 12, 1986 [JP] Japan .................. 61-52660

[51] Int. Cl.$^5$ .................. B29D 22/00; B65D 85/30; C08F 210/02
[52] U.S. Cl. .................. 428/36.92; 428/35.7; 428/36.8; 428/36.9; 206/389; 206/407; 526/348.6
[58] Field of Search .................. 526/348.6; 428/36.92, 428/35.7, 36.8, 36.9; 206/389, 407

[56] References Cited

U.S. PATENT DOCUMENTS

| | | | |
|---|---|---|---|
| 3,318,976 | 5/1967 | Short | 525/247 |
| 4,011,382 | 3/1977 | Levine et al. | 526/96 |
| 4,147,291 | 4/1979 | Akao et al. | 383/113 |
| 4,258,848 | 3/1981 | Akao et al. | 206/524.2 |
| 4,331,725 | 5/1982 | Akao | 428/138 |
| 4,337,285 | 6/1982 | Akao et al. | 428/35.3 |
| 4,356,224 | 10/1982 | Akao et al. | 428/220 |
| 4,359,499 | 11/1982 | Akao et al. | 428/201 |
| 4,386,124 | 5/1983 | Akao | 428/35.2 |
| 4,411,943 | 10/1983 | Akao | 428/161 |
| 4,411,945 | 10/1983 | Akao et al. | 428/216 |
| 4,436,809 | 3/1984 | Akao et al. | 430/501 |
| 4,452,846 | 6/1984 | Akao | 428/220 |
| 4,469,741 | 9/1984 | Akao | 428/214 |
| 4,513,050 | 4/1985 | Akao | 428/200 |
| 4,530,980 | 7/1985 | Radici | 526/348.6 |
| 4,565,733 | 1/1986 | Akao | 428/215 |
| 4,565,743 | 1/1986 | Akao | 428/522 |
| 4,576,865 | 3/1986 | Akao | 428/335 |
| 4,579,781 | 4/1986 | Akao | 428/461 |
| 4,584,234 | 4/1986 | Hirose et al. | 428/323 |
| 4,587,175 | 5/1986 | Akao | 428/596 |
| 4,629,640 | 12/1986 | Akao | 428/35.3 |
| 4,639,386 | 1/1987 | Akao | 428/36.92 |
| 4,653,640 | 3/1987 | Akao | 206/455 |
| 4,661,395 | 4/1987 | Akao | 428/213 |
| 4,661,401 | 4/1987 | Akao | 428/215 |
| 4,663,218 | 5/1987 | Akao | 428/212 |
| 4,687,692 | 8/1987 | Akao | 428/137 |

FOREIGN PATENT DOCUMENTS

| | | | |
|---|---|---|---|
| 0004651 | 10/1979 | European Pat. Off. | 526/348.6 |
| 0079214 | 5/1983 | European Pat. Off. | 524/232 |
| 2033910 | 5/1980 | United Kingdom | 526/348.6 |

OTHER PUBLICATIONS

Modern Plastics, Encyclopedia, Oct. 1983, vol. 60, No. 10A.

Plastiques Modernes et Elastomeres, vol. 34, No. 3, Apr. 1982, pp. 52-54.

Primary Examiner—Joseph L. Schofer
Assistant Examiner—Peter D. Mulcahy
Attorney, Agent, or Firm—Burns, Doane, Swecker & Mathis

[57] ABSTRACT

In a container for a photographic film cartridge having a body and a cap fitted to said body, the improvement comprising that said cap is molded from a resin containing more than 20% by weight of a low-pressure linear low-density polyethylene which is a copolymer of ethylene and butene-1 and has a density of 0.90 to 0.93 g/cm$^3$ and a melt index of 8 to 60 g/10 minutes. In the case of the molding resin for the cap of the invention, heat resistance is high, and this resin smoothly flow in a molding machine though temperature of the molten resin is relatively low. Accordingly, coloring troubles hardly occur, and molding cycle can be shortened. This resin is also superior in injection moldability, and molding troubles such as roping, camber, kink and deformation are rare. Mold shrinkage is also little. Since fitting strength of the cap and container body is large, the cap is scarcely detached during packaging process. Water vapor permeability of the resin of the cap is little, and moistureproofness of the container is high.

7 Claims, 1 Drawing Sheet

CONTAINER FOR PHOTOGRAPHIC FILM CARTRIDGE

This application is a continuation of application Ser. No. 024,473, filed Mar. 31, 1987, abandoned.

BACKGROUND OF THE INVENTION

1. Field of the Invention

This invention relates to a container for a photographic film cartridge which is characterized in its cap.

2. Description of the Prior Art

A conventional cap of a container for a photographic film cartridge was usually made of high-pressure branched low-density polyethylene (LDPE) resin having 0.927 g/cm$^3$ in density (ASTM D 1505) and 4.0 g/10 minutes in melt index (ASTM D 1238, MI). This resin is superior in flexibility at a low temperature, fitness of cap and body, compressive strength, and low occurrences of burrs and gate marks.

However, in the case of using the LDPE resin, molding troubles, such as a short shot of the molten resin, camber, kink and deformation, frequently occur. Its insufficient heat stability was also a problem. That is, the LDPE resin staying in a continuous molding machine at its screw, manifold, hot runner or other places was gradually colored brown or dark brown by heat. This colored resin was gradually extruded to cause coloring troubles. The generating rate of colored products was high such as 3 to 10%, and these products should be extracted by a checker or a checking machine. A more important problem was that when coloring trouble occurred, the molding machine must be disassembled and washed to remove the colored resin completely. A great deal of time and effort were spent for this cleaning work. As another problem, since the MI of the LDPE was low, its temperature should be high at the molding. As a result, the molding cycle became long.

In order to solve the coloring problem, when the cap was colored by blending carbon black, not only the appearance of the container became unfavorable but also manufacturing cost was elevated. Furthermore, when the whole container was colored black, the inside of the container became hot in the sunshine. This caused degradation of photographic film in it.

A metal container is also known (e.g. Japanese Utility Model KOKOKU No. 58-46413). However, the metal container was expensive, and its mass-producibility was inferior to a plastic container. Accordingly, it is not utilized, now.

SUMMARY OF THE INVENTION

An object of the invention is to provide a container for a photographic film cartridge having a cap which is produced without coloring troubles on molding troubles.

Another object of the invention is to provide a container for a photographic film cartridge having a cap which is superior in flexibility, fitness of cap and body, and compressive strength.

Still another object of the invention is to provide a container for a photographic film cartridge having a cap of which a molding cycle is short and the occurrence of burrs and gate marks are few.

Such objects are achieved by a cap containing a particular polyethylene resin.

DETAILED DESCRIPTION OF THE INVENTION

Figure 1:
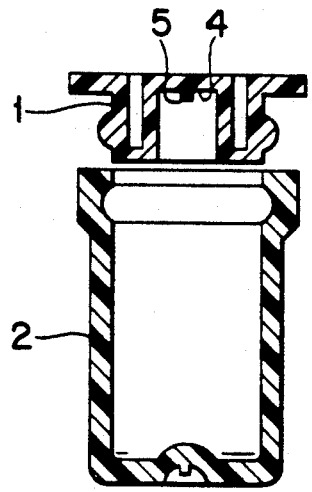
FIGS. 1 to 4 are sectional side views indicating several examples of the container to which the present invention is applied.
Figure 2:
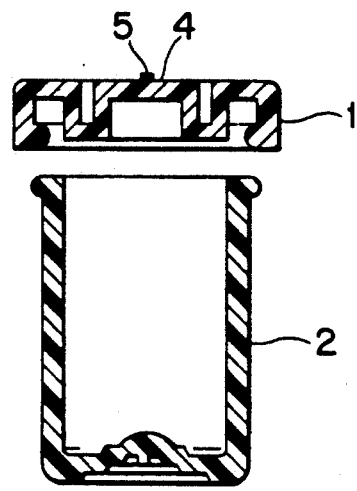

The cap of the invention is composed of a resin containing a particular linear low-density polyethylene (L-LDPE).

L-LDPE is a copolymer of ethylene and α-olefin, and it has a linear structure with short branches. The carbon number of the α-olefin is 3-13, and its ethylene content is usually 85-99.5 mol. %. Such a L-LDPE is manufactured by vapor phase or liquid phase, low or medium pressure method or modified high-pressure polymerization method. Examples of L-LDPE are "UNIPOLE" and "TUFLIN" (trade name, UCC), "DOWLEX" (trade name, Dow Chemical Co., Ltd.), "STAMILEX" (trade name DSM), "SUCLEAR" (trade name, Dupont de Nemour, Canada), "MARLEX" (trade name, Phillips Co., Ltd.), "ULTZEX" and "NEOZEX" (trade names, Mitsui Petroleum Chemical Industries Co., Ltd.), "NISSEKI LINIREX" (trade name, Nippon Petrochemicals Co., Ltd.), "IDEMITSU POLYETHYLENE-L" (Idemitsu Petrochemical Co., Ltd.) and "NUC POLYETHYLENE-LL" (trade names, Nippon Unicar Co., Ltd.).

Among them, the L-LDPE employed in the invention is a copolymer of ethylene and butene-1 having a density of 0.90 to 0.93 g/cm$^3$ and a melt index (MI) of 8 to 60 g/10 minutes. This L-LDPE resin is superior in injection molding, and molding troubles hardly occur. Its properties are similar to the conventional LDPE resin, and however, its heat resistance is higher than the LDPE resin by 10° C. or more. When its density is less than 0.90 g/cm$^3$, heat resistance becomes insufficient whereby coloring troubles occur. Moreover, rigidity also becomes low. On the other hand, when the density is beyond 0.93 g/cm$^3$, the MI becomes lower than 8 g/10 minutes. This L-LDPE resin is too rigid, and the fitness of cap and body becomes worse. As a result, cap is liable to detach upon dropping. When MI is lower than 8 g/10 minutes, melt viscosity becomes high so as to cause molding troubles. When the temperature of the molten resin is elevated in order to lower the viscosity, coloring troubles occur. The molding cycle is lengthened, and roping and gate mark troubles also happen. On the other hand, when the MI is beyond 60 g/10 minutes, rigidity becomes low. Molding troubles such as roping and burr also happen. L-LDPE is manufactured by the vapor phase method (UNION CARBIDE, MITSUBISHI PETROCHEMICAL CO., LTD., MITSUBISHI CHEMICAL INDUSTRIES LTD., NIPPON UNICAR CO., LTD., EXXON, MOBIL, SABIC, SHELL CANADA, ESSO CANADA, AMOCO, ESSOCHEM, EUROPE and NOVA CORP.), the liquid phase method (DUPONT CANADA, PHILIPS, SOLVAY, IDEMITSU PETROCHEMICAL CO., LTD., NIPPON PETROCHEMICAL CO., LTD., DSM-STAMICARBON and ELPASO) and the modified high-pressure polymerization method (CDF CHIMIE, TOYO SODA MANUFACTURING CO., LTD., SUMITOMO CHEMICAL CO., LTD., ASAHI CHEMICAL INDUSTRIES CO., LTD., etc.). The content of the L-LDPE resin is more than 20 wt. %.

An oxidation inhibitor is added in order to prevent coloring of the cap of the invention. This oxidation inhibitor may be a phenol oxidation inhibitor, a sulfur-containing oxidation inhibitor or a phosphorus-containing oxidation inhibitor. The phenol oxidation inhibitors include n-octadecyl-3-(3',5'-di-t-butyl-4'-hydroxyphenyl)propionate, 2,6-di-t-butyl-4-methylphenol, 2,6-di-t-butyl-p-cresol, 2,2'-methylenebis(4-methyl-6-t-butylphenol), 4,4'-thiobis(3-methyl(3-methyl-6-t-butylphenol), 4,4'-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene and tetrakis[methylene-3-(3',5'-di-t-butyl-4'-hydroxyphenyl)propionate]methane. The sulfur-containing oxidation inhibitors include dilauryl-3,3'-thiodipropionate, dimyristyl-3,3'-thiodipropionate, laurylstearylthiodipropionate, distearyl-3,3'-thiodipropionate and ditridecyl-3,3'-thiodipropionate. The phosphorus-containing oxidation inhibitor include trinoylphenylphosphite and triphenylphosphite. Among them, the phenol oxidation inhibitors are the most preferable. Commercial products belonging to the phenol oxidation inhibitors include various "IRGANOX" (CIBA-GEIGY AG) and "SUMILIZER BHT", "SUMILIZER BP-76", "SUMILIZER WX-R" and "SUMILIZER BP-101" (SUMITOMO CHEMICAL CO., LTD.). Two or more oxidation inhibitors may be combined. The content of the oxidation inhibitor is usually 0.001 to 1 wt. %. In the case that two or more oxidation inhibitors are added, the above content is the total amount of them. When the content is less than 0.001 wt. %, the effect of blending does not appear. While, when the content is more than 1 wt. %, the photographic film placed in such a container is adversely influenced by the oxidation inhibitor. Accordingly, a lower content in the range capable of preventing coloring is preferable. When the resin of the cap contains one or more resins, such as LDPE resin, in addition to the L-LDPE resin, the oxidation inhibitor may be blended to either or both of the L-LDPE resin and the other resin(s). Furthermore, the effect of the oxidation inhibitor synergistically appears by blending together with carbon black.

In addition to the L-LDPE resin and the oxidation inhibitor, the cap of the invention may contain another resin. A suitable resin is the LDPE resin having a density of 0.90 to 0.93 g/cm$^3$ and a MI of 4 to 50 g/10 minutes. By blending this resin, the screw load decreases, and melt fracture hardly occurs because of low melt viscosity. Besides, the temperature of molten resin can be lowered, and the molding cycle can be shortened. These merits may be caused by its molecular weight distribution being broader than L-LDPE resin and its molecular structure being branched. When its density is less than 0.90 g/cm$^3$, rigidity decreases, and coloring troubles occur because of less heat resistance. On the other hand, when the density is beyond 0.93 g/cm$^3$, the resin becomes too rigid. As a result, the fitness of cap and body is worse, and the cap is liable to detach upon dropping. Besides, the melt viscosity becomes high so as the cause molding troubles because of high molecular weight. When the temperature of the molten resin is elevated in order to lower the viscosity, coloring troubles frequently occur. The molding cycle is, and roping and gate mark troubles also happen. When the MI is lower than 4 g/10 minutes, the troubles which occur are similar to the case when the density is beyond 0.93 g/cm$^3$. While, when MI is beyond 50 g/10 minutes, the troubles to occur are similar to the case that the density is less than 0.90 g/cm$^3$. Commercial LDPE resins are "SUMIKATHENE" (SUMITOMO CHEMICAL CO., LTD), "MITSUBISHI POLYETHY" (MITSUBISHI PETROCHEMICAL CO., LTD), "MIRASON" (MITSUI POLYCHEMICALS CO., LTD.), "NUC POLYETHYLENE" (NIPPON UNICAR CO., LTD.), "UBE POLYETHYELNE" (UBE INDUSTRIES LTD.), "NISSEKI REXLON" (NIPPON PETROCHEMICALS CO., LTD.), "NIPOLON" (TOYO SODA MANUFACTURING CO., LTD.), "SHOLEX" (SHOWA DENKO K.K.), "NOVATEC-L" (MITSUBISHI CHEMICAL INDUSTRIES LTD.), "SUNTEC-LD" (ASAHI CHEMICAL INDUSTRIES CO., LTD.), etc. The content of the LDPE resin is less than 80 wt. %, and a suitable content is 5 to 70 wt. %.

In order to improve moldability and antistatic properties, a lubricant is preferably added to the resin of the cap of the invention. Its suitable content is in the range of 0.01 to 1 wt. %. When the content is less than 0.01 wt. %, the improvement of moldability is insufficient. While, when the content is beyond 1 wt. %, excess lubricant adversely influences upon the photographic film placed in the container. Moreover, the cap becomes sticky, and dust adheres to it. The screw of the molding machine slips, and thereby, the molding cycle is lengthened. Examples of commercial lubricants suitable for the present invention include;

Silicone lubricants; "SHINETSU SILICONE" (Shinetsu Chemical Co., Ltd.), "TORAY SILICONE" (Toray Silicone Co., Ltd.)

Oleic acid amide lubricants; "ARMOSLIP-CP" (Lion Akzo Co., Ltd.), "NEWTRON" and "NEWTRON E-18" (Nippon Fine Chemical Co., Ltd.), ∫AMIDE-O" (Nitto Kagaku K.K.), "DIAMID 0-200" and "DIAMID G-200" (Nippon Kasei Chemical Co., Ltd.), "ALFLOW E-10" (Nippon Oil and Fats Co., Ltd.)

Erucic acid amide lubricants; "ALFLOW P-10" (Nippon Oil and Fats Co., Ltd.)

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.)

Bis fatty acid amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.)

Alkylamine lubricants; "ELECTROSTRIPPER TS-2" (Kao Corp.)

A coloring material may be blended. As the coloring material, dye, pigment, metal powder, metal fiber and metal flake are usable. Examples of the coloring material rae as follows;

White coloring material; Titanium oxide, calcium carbonate, mica, zinc oxide, clay, barium sulfate, calcium sulfate, magnesium silicate, etc.

Yellow coloring material; Titanium yellow, yellow iron oxide, chrome titanium yellow, diazo pigment, vat pigment, quinophthalene pigment, isoindolenone, etc.

Red coloring material; Red iron oxide, diazo pigment, berlin pigment, monoazo lake pigment, condensed azo pigment, etc.

Blue coloring material; Cobalt blue, ultramarine, Cyanine Blue, etc.

Green coloring material; Chromium oxide green, titanium green, Cyanine Green, etc.

Black coloring material; Carbon black, black iron oxide, etc.

Silver coloring material; Aluminum powder, aluminum paste, tin powder, etc.

Among them, carbon black is preferable because of its synergistic antioxidative effect, masking of coloring trouble and inexpensiveness. Content of coloring material is preferably less than 3 wt. % such as 0.1 to 1 wt. %.

Various additives in addition to those mentioned previously may be added to the resin for cap. Examples of the additives are described below.

(1) Plasticizer;
phthalic acid esters, glycol esters, fatty acid esters, phosphoric acid esters, etc.

(2) Stabilizer;
lead compounds, cadmium compounds, zinc compounds, alkaline earth metal compounds, organic tin compounds, etc.

(3) Antistatic agent;
cation surfactants, anion surfactants, nonion surfactants, ampholytic surfactants, etc.

(4) Flame retardant;
phosphoric acid esters, phosphoric acid ester halides, halides, inorganic materials, polyols containing phosphororous, etc.

(5) Filler;
alumina, kaolin, clay, calcium carbonate, mica, talc, titanium oxide, silica, etc.

(6) Reinforcing agent;
glass lobing, metallic fiber, glass fiber, glass milled fiber, carbon fiber, etc.

(7) Nucleating agent;
inorganic nucleating agents, organic nucleating agents (such as dibenzylidenesorbitol)

(8) Vulcanizing agent;
vulcanization accelerator, acceleration assistant, etc.

(9) Deterioration preventing agent;
ultraviolet absorber, metal deactivator, peroxide decomposing agent, etc.

(10) Coupling agent;
silane compounds, titanium compounds, chromium compounds, aluminum compounds, etc.

(11) Various thermoplastic resins, rubbers, particularly, polyolefin thermoplastic resins The cap of the invention is a fitting type. Its form is not limited, and examples are illustrated in FIGS. 1 to 4. In the drawings, 1 represents cap, 2 represents container body, 3 represents pit, 4 represents gate portion, and 5 represents gate mark.

The molding method of cap is not limited, and the cap may be produced by hot runner type injection molding, inter mold vacuum injection molding or stack molding.

Examples of the form of container body are also illustrated in FIGS. 1 to 4. Material of the container body is usually a plastic. Suitable plastics include polyolefins such as polyethylene, polypropylene and polyester. The container body is preferably more rigid than its cap. The container body may be produced by injection molding, injection blow molding, blow molding or the like.

In the case of the molding resin for the cap of the invention, heat resistance is high, and this resin smoothly flows in a molding machine though temperature of the molten resin is relatively low. Accordingly, coloring troubles hardly occur, and the molding cycle can be shortened. This resin is also superior in injection moldability, and molding troubles such as roping, camber, kink and deformation are rare. Mold shrinkage is also small. Since fitting strength of the cap and container body is large, the cap is rarely detached during packaging process. Water vapor permeability of the resin of the cap is small, and moistureproofness of the container is high.

EXAMPLES

Figure 3:
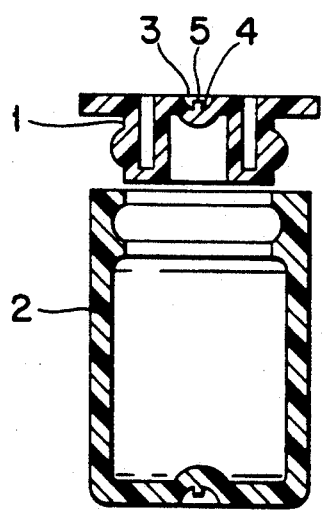
Figure 4:
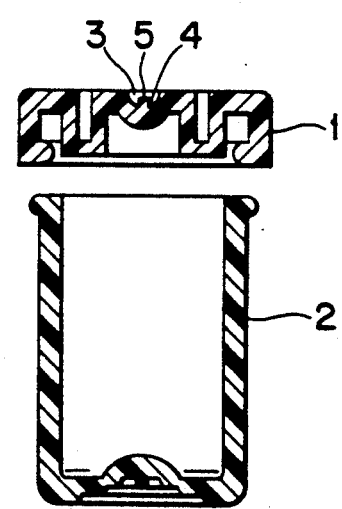

The cap illustrated in FIG. 3 was molded by using the molding machine manufactured by SUMITOMO HEAVY INDUSTRIES LTD. (trade name "NETSTAL") at mold clamping pressure of 150t. The molding number per once was 24, and the type of runner was a hot runner.

The resin of Example 1 employed for molding a cap was a mixture of 40 wt. % of the L-LDPE resin "NUC G 5391" (NIPPON UNICAR CO., LTD.) of a copolymer of ethylene and butene-1 having 0.926 g/cm$^3$ in density and 50 g/10 minutes in MI and 60 wt. % of the LDPE resin having 0.927 g/cm$^3$ in density and 4.0 g/10 minutes in MI containing an oxidation inhibitor.

The resin of Example 2 employed for molding a cap was a mixture of 80 wt. % of the L-LDPE resin and 20 wt. % of the LDPE resin containing the oxidation inhibitor, which are the same as Example 1.

The resin of Example 3 employed for molding a cap was the L-LDPE resin of Example 1, alone.

The resin of Example 4 employed for molding a cap was the L-LDPE resin "NUC G 5381" (NIPPON UNICAR CO., LTD.) of a copolymer of ethylene and butene-1 having 0.924 g/cm$^3$ in density and 20 g/10 minutes in MI containing the oxidation inhibitor of Example 1, alone.

The resin of Example 5 employed for molding a cap was a mixture of 60 wt. % of the L-LDPE resin "STAMLEX 1258" (DSM-STAMICARBON) of a copolymer of ethylene and butene-1 manufactured by low-pressure liquid phase method having 0.925 g/cm$^3$ in density and 25 g/10 minutes in MI containing the oxidation inhibitor of Example 1 and 40 wt. % of the LDPE resin "MITSUBISHI POLYETHY YK-60".

The resin of Comparative cap 1 was the L-LDPE resin "ULTZEX #20200J" (MITSUI PETROCHEMICAL INDUSTRIES CO., LTD.) of a copolymer of ethylene and 4-methylpentene-1 having 0.920 g/cm$^3$ in density and 18 g/10 minutes in MI, alone.

The resin of Comparative cap 2 was a mixture of 10 wt. % of the L-LDPE resin "NUC G 5381" and 90 wt. % of the LDPE resin "MITSUBISHI POLYETHY YK-60".

The resin of Comparative cap 3 was the L-LDPE resin "NUC G 5361" (NIPPON UNICAR CO., LTD.) of a copolymer of ethylene and butene-1 having 0.925 g/cm$^3$ in density and 4.0 g/10 minutes in MI containing the oxidation inhibitor of Examples 1.

The resin of Conventional cap 1 was the LDPE resin which was the same as described in Example 1.

As the container body, the body illustrated in FIG. 3 was employed. The resin of the body was the random type polypropylene resin containing a nucleating agent. This resin comprised the polymer of which the content of propylene unit was 96 mol. % and the content of ethylene unit was 4 mol. %. The MI of the resin was 40 g/10 minutes, the yielding point of tensile stress was 370 kg/cm$^2$, the bending elastic modulus was 14,000 kg/cm$^2$, and the notched impact strength at 20° C. measured by Izod testing machine was 5.0 kg.cm/cm.

Constitutions of the caps and their properties are tabulated in Table 1.

TABLE 1

|  | Unit | Invention 1 | Invention 2 | Invention 3 | Invention 4 | Invention 5 | Comparative 1 | Comparative 2 | Comparative 3 | Conventional |
|---|---|---|---|---|---|---|---|---|---|---|
| L-LDPE | | | | | | | | | | |
| α-Olefin | — | $C_4$ | $C_4$ | $C_4$ | $C_4$ | $C_4$ | $C_6$ | $C_4$ | $C_4$ | — |
| Density | g/cm³ | 0.926 | 0.926 | 0.926 | 0.924 | 0.925 | 0.920 | 0.924 | 0.925 | — |
| MI | g/10 min. | 50 | 50 | 50 | 20 | 25 | 18 | 20 | 4 | — |
| Content | wt. % | 40 | 80 | 100 | 100 | 60 | 100 | 10 | 100 | — |
| LDPE | | | | | | | | | | |
| Density | g/cm³ | 0.927 | 0.927 | — | — | 0.927 | — | 0.927 | — | 0.927 |
| MI | g/10 min. | 4.0 | 4.0 | — | — | 4.0 | — | 4.0 | — | 4.0 |
| Content | wt. % | 60 | 20 | — | — | 40 | — | 90 | — | 100 |
| Coloring Degree | — | B | B | B | B | B | B | D | D | E |
| Temperature of Molten Resin | °C. | 170 | 150 | 140 | 160 | 170 | 180 | 190 | 220 | 200 |
| Molding Cycle | sec. | 10 | 8 | 7 | 9 | 10 | 12 | 12 | 16 | 13 |
| Molding Trouble | — | B | B | B | B | B | B | C | E | C |
| Roping, Gate Mark | — | B | B | B | B | B | E | B | D | B |
| Cap Detachment | — | B | B | B | B | B | B | C | B | D |
| Compressive Strength | kg | 31 | 33 | 35 | 37 | 34 | 38 | 25 | 41 | 21 |
| Fitting Strength | kg | 2.3 | 2.5 | 2.7 | 2.8 | 2.4 | 3.0 | 1.8 | 3.1 | 1.5 |
| Water Vapor Permeability | mg/24 hr. | 2.2 | 1.8 | 1.5 | 1.3 | 1.7 | 1.2 | 3.1 | 1.1 | 4.0 |

Evaluations in Table 1 were carried out as follows.

| A | very excellent | B | excellent |
|---|---|---|---|
| C | practical | D | having a problem |
| E | impractical | | |

Testing methods are as follows:
Density; ASTM D-1505
Melt Index; ASTM D-1238

Coloring Degree; Coloring degree of the product produced continuously at the optimal temperature for each resin without molding trouble.

Temperature of Molten Resin; The resin temperature at the optimal molding condition for each resin where molding trouble hardly occurs.

Molding Cycle; Time of one shot of injection-cooling-taking out at the optimal molding condition.

Molding Trouble; Occurrence of molding trouble such as camber, bottom sink mark, short shot and burr at the optimal molding condition for each resin.

Roping, Gate Mark; Occurrence of long roping formed at gate mark portion in 50 shots (1200 pieces) of products.

Cap Detachment; A photographic film cartridge containing a photographic film of 36 exposures ("Fuji Color HR-100", 36 Ex.) was placed in each container. Each container was dropped from 5 meters height to concrete floor, and the number of cap-detached containers were counted. In order to avoid the detachment of the cap caused by breaking of the container body, the container body made of polypropylene resin containing polyethylene in a high content was used.

Compressive Strength; A spring balance was provided with a grip member. Each cap was grasped by the grip member, and the spring balance was pulled in the just upward direction. The force necessary to detach each cap was measured.

Water Vapor Permeability; About 4 g of calcium chloride was exactly weighed, and placed in each container. Each cap was attached, and the container was allowed to stand in a room controlled at 40° C. and 90% in humidity for 24 hours. Increase in the weight of calcium chloride was exactly weighed by a precision balance, and the increase amount was employed as water vapor permeability.

We claim:

1. In a container sized and constructed for holding a 35 millimeter photographic film cartridge, said container having a body and cap fitted to said body, the improvement comprising that said cap is molded from a resin containing 0.001 to 1 wt % of a phenol oxidation inhibitor and more than 20% by weight of a low-pressure linear low-density polyethylene which is a copolymer of ethylene and butene-1 and having a density of 0.90 to 0.93 g/cm³ and a melt index of 8 to 60 g/10 minutes.

2. The container of claim 1, wherein said resin further contains a high-pressure branched low-density polyethylene having a density of 0.90 to 0.93 g/cm³ and a melt index of 4 to 50 g/10 minutes.

3. The container of claim 1, wherein said resin further contains 0.01 to 1 wt. % of a lubricant.

4. The container of claim 1, wherein said resin further contains a coloring material.

5. The container of claim 4, wherein said coloring material is carbon black.

6. The container of claim 3 wherein said lubricant is an oleic acid amide lubricant.

7. In a container for holding a photographic film cartridge said container having a body and cap fitted to said body, comprising the improvement that said cap is molded from a resin containing 0.001 to 1 wt. % of a phenol oxidation inhibitor and more than 20% by weight of a low-pressure linear low-density polyethylene which is a copolymer of ethylene and butene-1 and having a density of 0.90 to 0.93 g/cm³ and a melt index of 8 to 60 g/10 minutes, wherein said container is sized and constructed for holding a 35 millimeter film cartridge.

* * * * *